United States Patent Office 3,478,612
Patented Nov. 18, 1969

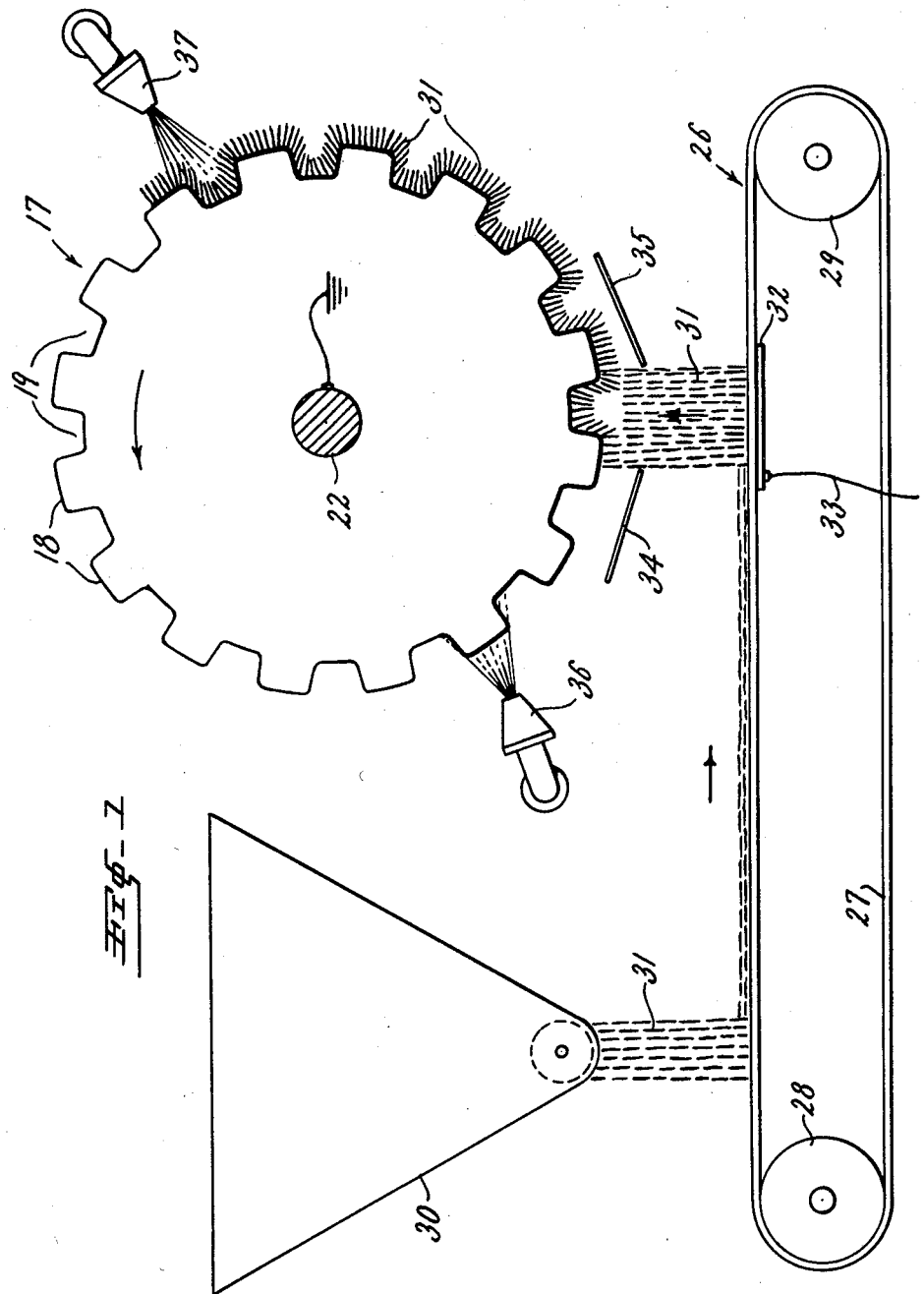

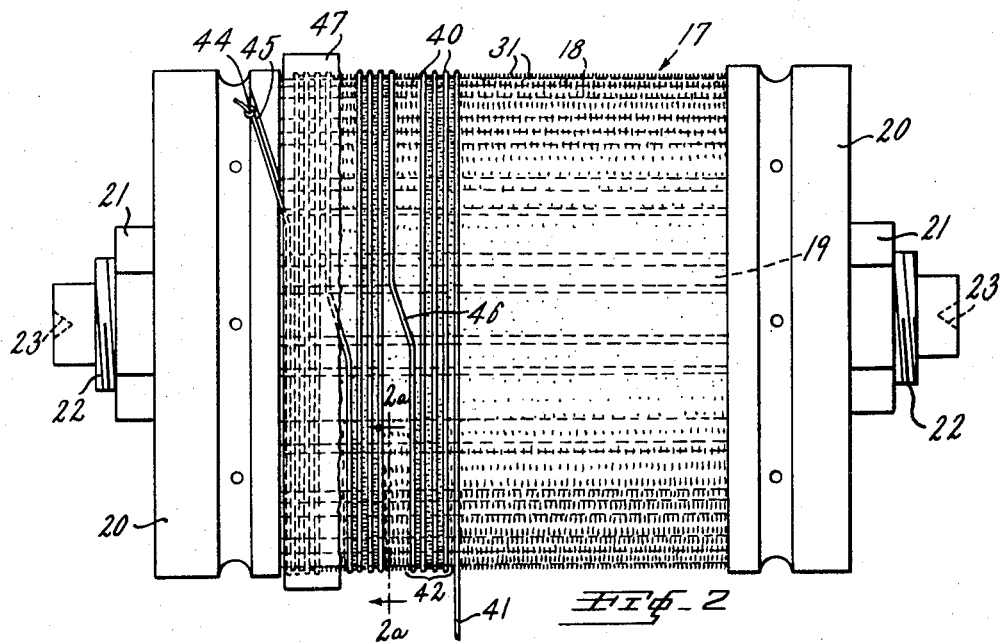
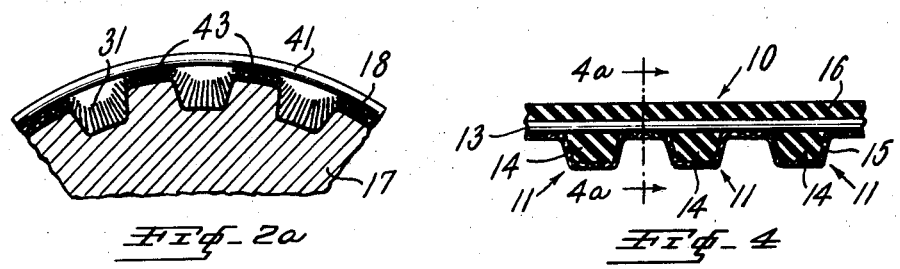
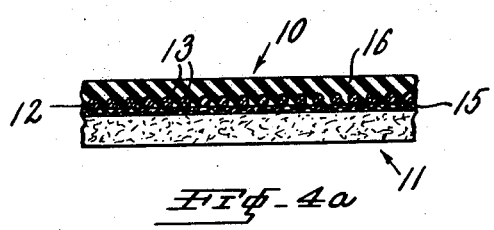

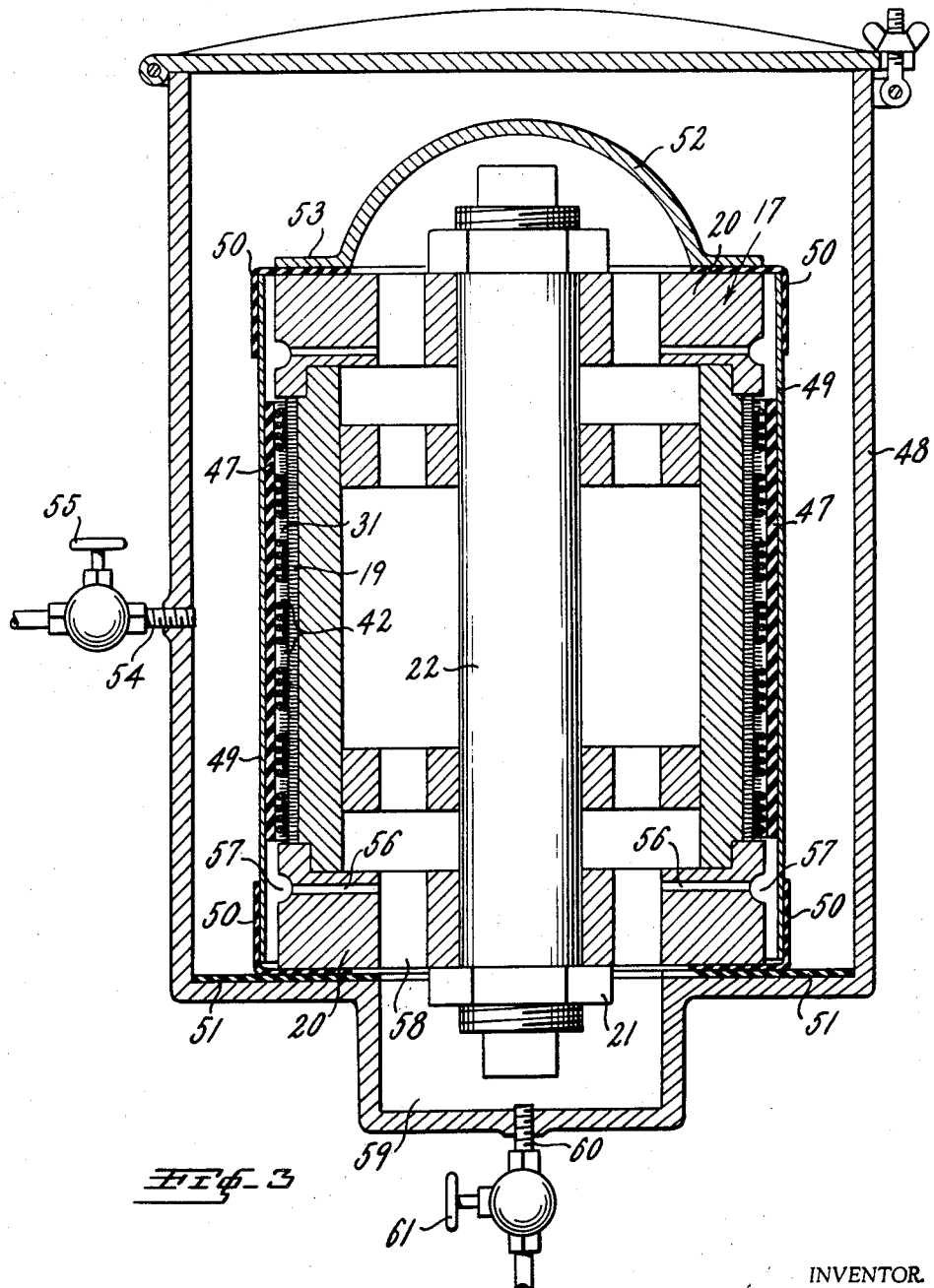

3,478,612
POSITIVE BELT STRUCTURE
Robert E. Wetzel, Huntingdon Valley, Pa., assignor to Uniroyal, Inc., a corporation of New Jersey
Original application Jan. 11, 1965, Ser. No. 424,760, now Patent No. 3,418,186, dated Dec. 24, 1968. Divided and this application June 28, 1968, Ser. No. 754,144
Int. Cl. F16g 1/26
U.S. Cl. 74—232       3 Claims

ABSTRACT OF THE DISCLOSURE

A drive belt having an endless load carrying band, a plurality of spaced teeth bonded to said band, and a wear-resistant compressed flock covering bonded to the surfaces of said teeth and to the surface of said belt in the spaces between said teeth.

---

This is a division of application Ser. No. 424,760 filed Jan. 11, 1965, now Patent No. 3,418,186.

This invention relates to a new construction for positive drive belts and to methods for making same.

Heretofore, positive drive toothed belts for use in combination with gears or pulleys, such as the belt shown in the United States Patent No. 2,507,852 which issued on May 16, 1950 to R. Y. Case, have been made with protective fabric jackets or coverings made from a single sheet of stretchable fabric. The use of a protective covering is very desirable, since it provides a wear-resistant surface for the elastic teeth and for the load carrying band located in the spaces between the teeth. The aforementioned U.S. Patent No. 2,507,852 describes one method for applying such a covering to a positive drive belt and United States Patent No. 3,078,206 which issued on Feb. 9, 1963 to W. A. Skura describes an improved method for applying a similar covering.

Although belts made in accordance with the teachings of the above cited patents have been very successful in operation, the fabrics necessary to construct these belts are expensive and require specialized handling which is very time consuming.

Accordingly, it is an object of this invention to provide a new and improved belt construction and a method of making same.

A further object is to provide a positive drive belt that is less expensive to manufacture.

A still further object of this invention is to provide a belt having a new and improved wear-resistant covering which is applied to the belt by a unique method.

The above and other objects are accomplished in accordance with this invention which comprises a positive drive belt having an endless load carrying band and resilient teeth bonded to the band at spaced intervals, the surfaces of the teeth and the spaces between the teeth having a wear-resistant covering of compressed flock bonded thereto.

According to one embodiment of this invention, the above-described belt is made by applying flock to the surface of a mold, the surface having a cylindrical body portion and axially extending grooves forming tooth cavities therein; applying a load carrying band over the flock on the body portion; forcing elastomeric material into the grooves and around the band; and curing the material. The forcing of the material into the tooth grooves results in a compression of the flock against the mold surface and also bonds the flock together to form a wear-resistant covering for the teeth of the belt.

For a better understanding of the present invention together with other and further objects thereof reference is made to the following description, taken in connection with the accompanying drawings, and its scope will be pointed out in the appended claims.

Referring now to the drawings:

FIG. 1 is a schematic view of apparatus for practicing a method according to one embodiment of this invention;

FIG. 2 is an elevational view of a belt mold with the belt parts built up thereon in readiness for the molding operation, but showing parts of the belt broken away to better illustrate the method;

FIG. 2a is a sectional view of the mold of FIG. 2 taken along line 2a—2a;

FIG. 3 is a vertical cross-sectional view of a belt mold with the belt parts built up thereon and assembled in a vulcanizer in position for the final vulcanizing operation;

FIG. 4 is a longitudinal sectional view of a toothed belt made in accordance with this invention;

FIG. 4a is a fragmentary sectional view of the belt of FIG. 4 taken along line 4a—4a.

Referring first to FIGS. 4 and 4a of the drawings, the belt 10 made in accordance with the method comprises resilient teeth 11, which are bonded to a load carrying band 12 of flexible substantially non-stretchable material having voids therein. As shown herein the band 12 is made of a plurality of helical convolutions of a strand 13, which may be cord or wire or any other suitable material. However, the band may be made of suitable loosely woven fabric having its ends suitably joined, or spliced, in the event the belt is to be used for very light loads. The body 14 of the belt teeth is made of rubber, which term is intended to include synthetic elastomeric material as well as natural rubber, and the teeth 11 are covered with a wear-resistant covering 15, which is united to the rubber body 14 and the load carrying band 12 between the belt teeth 11. If desired, the belt 10 may be provided with a top cover of rubber 16, which extends through the load carrying band 12 and is united to the rubber tooth body 14 and the load carrying band 12, and also to the wear-resistant covering 15 between the teeth 11.

The method of making the belt shown in FIGS. 4 and 4a will now be described in detail. The elements of belt 10 are built up upon a mold 17 (see FIGS. 1 and 2) having a cylindrical body portion 18 provided with axially extending grooves 19 in its outer circumference constituting belt tooth cavities for the formation of the belt teeth 11. The body of the mold 17 is provided with end plates 20 (see FIG. 2) which are clamped to the ends of the body 18 by nuts 21 threaded into each of the ends of a spindle 22 having centering bores 23.

Referring to FIG. 1, the initial operation in the fabrication of belt 10 involves the application of flock to the cylindrical body portion 18 and grooves 19 of mold 17. Mold 17 is suitably mounted for rotation on a support (not shown) above an endless conveyor 26. Conveyor 26 comprises a flat belt 27 which is approximately as wide as mold 17 and is constructed of any suitable insulating material. Belt 27 is mounted for movement around rollers 28 and 29. A hopper 30 is located above the upstream end of belt 27 and is adapted to deposit flock 31 onto the surface of belt 27. The function of flock 31 is to provide the wear-resistant covering 15 for belt 10. Consequently, a nylon flock has been found to be very effective for the covering, however, any suitable flock material is useable with this invention so long as the flock is electrostatically changeable and provides a suitable abrasion resistance.

Flock 31 is moved downstream by belt 27 into a charging area which overlies a grid 32 over which belt 27 passes. Grid 32 is connected by lead 33 to an electrostatic generator (not shown) which supplies the grid with current at very high voltage. As fibers 31 pass into the charging area over grid 32 they receive a charge of the same polarity as the grid. Mold 17, which is positioned directly above grid 32, is grounded and, consequently, attracts the oppositely charged flock.

A pair of baffles 34 and 35 are provided to direct the flock to only a small area on mold 17. It has been found that substantially immediately upon contact with mold 17 the charge on the flock is neutralized and the flock is pulled way from the mold by gravity or by the attraction of grid 32. To counteract the tendency of the flock to be separated from the mold, an adhesive is applied to the mold surface prior to the flocking operation. The adhesive, which may be a latex base adhesive, may be sprayed on the mold by a nozzle 36 or may be applied by any other suitable means. A mold release, such as silicon, may also be applied before or concurrently with the flocking. The adhesive adheres at least a portion of the flock fibers to the surface of mold 17, the remainder of which protrudes outwardly and is oriented in a direction substantially perpendicular to the body portion of the mold and to the surfaces of grooves 19. This orientation of flock allows very dense deposits of flock to be obtained because each fiber occupies only a very small area of the mold surface.

After flocking, the first coat of adhesive is dried and a second coat of adhesive is sprayed over the flock by nozzle 37. This additional coat of adhesive is sprayed over the flock to promote adhesion between the flock and the remainder of belt 10. The second coat of adhesive is then dried and the remainder of the belt built over the flock in a manner to be described hereinbelow.

Prior to building the additional elements of belt 10 on mold 17, the mold is placed in a conventional winding machine and centered between the winding head and the tail stock by the entrance of the centering pins of the machine into the centering bores 23 on the spindle 22. Mold 17 may be manually or automatically rotated by the winding machine, which will enable the operator to apply the belt elements thereto. A plurality of belts are built up on the mold for each molding operation, and each of the elements of the several belts are applied as a unit.

The load carrying bands 12 for the several belts are formed on the mold by automatically winding over the flock 31 a plurality of turns, or convolutions 40 of a strand 41 in groups 42, thereby forming the load carrying band 12 for each belt. As strand 41 is wound around the body portion 18 of mold 17, the strand contacts and mats down the flock 31. As seen in FIG. 2a, a layer of compressed flock 43 is formed beneath strand 41 and supports the strand away from the body portion 18 of the drum. Load carrying band 12 may be made from strands 41 of flexible and substantially non-stretchable material such as prestretched cord, or wire; if desired, this band may be made from other materials that are substantially inextensible but presents voids or spaces through which rubber may flow. As shown in FIG. 2, the starting end 44 of the strand is secured with a knot on its end in a groove 45 in the left end plate 20. The groups 42 of convolutions for each of the load carrying bands 12 of the belt are automatically wound over the flock 31 with a jump portion 46 between each of the groups.

A rubber layer 47 may be applied over the convolutions 40 of the stand 41 in the form of a calendered sheet, and is of sufficient thickness to provide the extruded rubber body portion 14 of the belt. This thickness can be varied to adequately provide the top covering layer 16 since only a portion of the rubber 47 is forced through the load carrying band 12. As used herein, the term "extruded rubber" and its related forms, refers to the rubber which is forced or pushed in to fill the cavity of the external mold. In order to permit the passage of the rubber 47 through the load carrying band 12, sufficient voids in the band 12 are provided when the convolutions 40 therein are so wound that the surface area occupied by the strands is between 48% and 72% of the total surface area of the band.

Layer 47 may be composed of any suitable plastic, such as vulcanizable rubber, or rubber-like materials, which have the proper flow characteristics which will permit it to be forced between the convolutions 40, and then be cured into a firm solid having a durometer A reading of 75–80. For example the rubber layer may be composed of the following rubber compound:

| Ingredients: | Parts |
| --- | --- |
| Neoprene rubber GRT (solid) | 85.00 |
| Neoprene rubber FB (liquid) | 15.00 |
| Stearic acid | .50 |
| Light magnesium oxide | 7.00 |
| Anti-oxidant | 2.00 |
| Carbon black | 55.00 |
| Zinc oxide | 2.00 |
| Low molecular wgt. polyethylene | 6.00 |
| Mercaptobenzothiazole | .75 |
| Total | 173.25 |

The above compound should have a Mooney plastometer reading with the large rotor of 30–40 at 212° F., after being mixed on a mill or in a Banbury mixer in the usual manner. The neoprene rubber FB (liquid) and the low molecular weight polyethylene impart to the compound the necessary flow characteristics, to cause it to become relatively liquid when heated below the vulcanizing temperature so that it can be forced through the convolutions 40 of the load carrying band. When the vulcanization is completed, the rubber has the required hardness for the belt teeth, a durometer A reading of from 75–80.

Having assembled the belt elements on the mold 17, the assembly is removed from the winding machine and prepared to be placed in the steam vulcanizer 48 (see FIG. 3) in which a portion of the rubber layer 47 is forced into the tooth cavities 19 and the rubber is cured. As shown in FIG. 3, a sheet metal collapsible sleeve 49 is placed around the layer 47 and is held in place by a surrounding contacting spring band (not shown). Angularly shaped gaskets 50 are placed over the ends of the sleeve 49 and over the mold end plates 20 at each end of the mold. The assembly is then placed in the vulcanizer 48 in a vertical position so that one of the gaskets 50 is supported on a gasket 51 at the bottom of the vulcanizer. A dome shaped cover 52 is placed on top of the mold. A flange 53 of the dome 52 extends over the top gasket 50 to seal the upper end of the mold.

As will be noted, the mold 17 is hollow and its interior is sealed from its exterior by the gaskets 50 interposed between the top end plate 20 of the mold and the dome 52 and between the bottom end place 20 and the bottom of the vulcanizer.

The layer of rubber 47 is caused to conform to the exterior shape of the mold body 18 by subjecting the exterior of the collapsible sleeve 49 to gaseous pressure, and permitting any trapped gases on the interior of the metal sleeve 49 to escape. Pressure is applied to the exterior of the sleeve 49 by admitting steam at approximately 100 pounds per square inch pressure into the vulcanizer 48 through a steam connection 54 which is controlled by a valve 55. Sleeve 49 is collapsed, that is, contracted circumferentially, and any trapped gases between the interior of the collapsible sleeve 49 and the exterior cylindrical surface of mold 17 are permitted to escape through radial passages 56 in the end plates 20. The outer ends of the passages 56 are connected to circumferential grooves 57 in the end plates, which collect any trapped gases from the axially extending grooves 19 in the exterior of the mold, and conveys such gases through the passage 56 to the inner ends thereof which are connected to openings 58 in the end plates, and which communicate with the bottom recess 59. The gases are then exhausted to the atmosphere through a pipe connection 60 which is controlled by a valve 61.

The steam at 100 pounds pressure is sufficiently hot to soften the rubber layer 47, and such pressure is sufficiently high to collapse the sleeve 49 and force the relatively fluid rubber through the voids in the helical groups of convolutions 42 of the load carrying band 12 and into the axially extending grooves 19 to form the belt teeth 11. The rubber forces the flock 31 ahead of it and causes it to conform to the exterior shape of the tooth forming grooves 19. The rubber 47 softens below its curing temperature, and as there is a sufficient volume of rubber in the layer 47 to form the top cover 16 of the belt, the complete filling of the grooves 19 is effected and accurately shaped belt teeth are produced. After the grooves 19 are completely filled additional heat is supplied to vulcanizer 48 to cure the rubber portion of the belt and to firmly bond the compressed flock together to form a wear-resistant covering for the teeth.

After the belt has been cured, mold 17 is removed from vulcanizer 48 by first removing the surrounding gaskets and sleeve, and then removing one of the end plates 20 and finally stripping the molded belt band from the mold. Individual belts may be sliced from the molded belt band by cutting the band circumferentially between the groups of strand convolutions of the load carrying band.

Although the preferred embodiment of this invention is described above, other methods may be used for forming the various belt components subsequent to the flocking operation. One such method is described in the original "Timing Belt" patent, United States Patent No. 2,507,852, issued on May 16, 1950 to R. Y. Case. In this patent the belt components are built up by extruding the individual belt teeth in the shape of the mold cavities, forcing the extruded rubber into the axially extending grooves over a previously applied layer of jacket fabric, winding the layer of tension cord, and applying the top rubber. The assembly is then vulcanized to complete the operation.

With the present invention the extruded rubber may be forced into the flocked grooves and the remaining steps performed to thereby form the toothed belts having a wear-resistant covering of compressed flock bonded to the surface of the teeth and to the spaces between the teeth.

It will be apparent from the foregoing description that the present invention provides a positive drive belt having a new and improved wear-resistant covering. Furthermore, the invention provides a method for making positive drive belts, which method comprises a new and improved process for applying a dense layer of flock to a mold surface and for compressing said flock to form a wear-resistant covering for the belt.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. A positive drive belt comprising: an endless load carrying band; resilient teeth bonded to said band at spaced intervals; and a wear-resistant covering of compressed flock bonded to the surface of said teeth and to the portions of the belt between said teeth.

2. A positive drive belt comprising: an endless load carrying band; resilient teeth bonded to said band at spaced intervals; and a wear-resistant covering of compressed flock bonded to the surface of said teeth and to said load carrying band in the spaces between said teeth.

3. A positive drive belt comprising: a body of elastic material; resilient teeth bonded to one side of said body at spaced intervals; and endless load carrying band embedded in the neutral zone of said body substantially on the dedendum line of said teeth; and a wear-resistant covering of compressed flock bonded to the surface of said teeth and to the portions of the belt between said teeth.

References Cited

UNITED STATES PATENTS

| 2,461,654 | 2/1949 | Nassimbene | 74—232 |
| 2,831,359 | 4/1958 | Carle. | |
| 3,190,137 | 6/1965 | Adams | 74—233 |
| 3,334,524 | 8/1967 | Chalk | 74—232 |

FRED C. MATTERN, Jr., Primary Examiner

JAMES A. WONG, Assistant Examiner